(12) United States Patent
Choi

(10) Patent No.: US 12,456,530 B2
(45) Date of Patent: Oct. 28, 2025

(54) SEMICONDUCTOR DEVICE FOR PROGRAMMING OR ERASING SELECT TRANSISTORS AND METHOD OF OPERATING THE SAME

(71) Applicant: SK hynix Inc., Icheon-si (KR)

(72) Inventor: Hyung Jin Choi, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 256 days.

(21) Appl. No.: 18/310,290

(22) Filed: May 1, 2023

(65) Prior Publication Data
US 2024/0177783 A1    May 30, 2024

(30) Foreign Application Priority Data
Nov. 25, 2022    (KR) .......................... 10-2022-0159852

(51) Int. Cl.
| G11C 16/14 | (2006.01) |
| G11C 11/56 | (2006.01) |
| G11C 16/04 | (2006.01) |
| G11C 16/10 | (2006.01) |
| G11C 16/12 | (2006.01) |
| G11C 16/16 | (2006.01) |
| G11C 16/26 | (2006.01) |
| G11C 16/34 | (2006.01) |

(52) U.S. Cl.
CPC ...... *G11C 16/3459* (2013.01); *G11C 11/5628* (2013.01); *G11C 16/0483* (2013.01); *G11C 16/10* (2013.01); *G11C 16/12* (2013.01); *G11C 16/14* (2013.01); *G11C 16/16* (2013.01); *G11C 16/26* (2013.01); *G11C 16/3404* (2013.01); *G11C 16/3445* (2013.01)

(58) Field of Classification Search
CPC . G11C 16/3459; G11C 16/0483; G11C 16/16; G11C 16/3445; G11C 11/5628; G11C 16/10; G11C 16/14; G11C 16/12; G11C 16/26; G11C 16/3404
See application file for complete search history.

(56) References Cited

U.S. PATENT DOCUMENTS

| 9,013,924 B2 * | 4/2015 | Yang | G11C 16/0483 365/185.17 |
| 9,524,793 B1 * | 12/2016 | Lee | G11C 16/10 |
| 11,049,579 B2 * | 6/2021 | Hsu | G11C 11/5642 |
| 2012/0314506 A1 * | 12/2012 | Baek | G11C 7/12 365/185.25 |
| 2015/0332783 A1 * | 11/2015 | Jeong | G11C 16/3459 365/185.11 |
| 2016/0071581 A1 * | 3/2016 | Lee | G11C 11/5671 365/185.03 |

(Continued)

FOREIGN PATENT DOCUMENTS

KR    1020160107606 A    9/2016

*Primary Examiner* — Amir Zarabian
*Assistant Examiner* — Justin Bryce Heisterkamp
(74) *Attorney, Agent, or Firm* — WILLIAM PARK AND ASSOCIATES LTD.

(57) ABSTRACT

In a semiconductor memory device, a program voltage is applied to select lines, which are coupled to corresponding select transistors included in a plurality of string groups. A verify operation on the select transistors is then performed, which simultaneously checks the operation of first select transistors included in a first string group and second select transistors included in a second string group.

20 Claims, 11 Drawing Sheets

(56) References Cited

U.S. PATENT DOCUMENTS

| | | | | |
|---|---|---|---|---|
| 2016/0293271 A1* | 10/2016 | Won | ................ | G11C 29/12005 |
| 2017/0117055 A1* | 4/2017 | Kim | ................... | G11C 16/3459 |
| 2017/0133095 A1* | 5/2017 | Park | ................... | G11C 16/3459 |
| 2017/0140829 A1* | 5/2017 | Park | ...................... | G11C 16/20 |
| 2018/0047449 A1* | 2/2018 | Nam | ................... | G11C 16/3454 |
| 2020/0143886 A1* | 5/2020 | Lee | ..................... | G06F 3/0659 |
| 2020/0243140 A1* | 7/2020 | Lim | .................... | G11C 7/1063 |
| 2021/0027851 A1* | 1/2021 | Park | ................... | G11C 16/0483 |
| 2021/0280260 A1 | 9/2021 | Shiino et al. | | |
| 2023/0038152 A1* | 2/2023 | Lee | ...................... | G11C 16/08 |
| 2023/0143829 A1* | 5/2023 | Cho | ..................... | G11C 16/26 |
| | | | | 365/185.18 |
| 2024/0120008 A1* | 4/2024 | Choi | .................... | G11C 16/24 |

\* cited by examiner

SEMICONDUCTOR DEVICE FOR PROGRAMMING OR ERASING SELECT TRANSISTORS AND METHOD OF OPERATING THE SAME

CROSS-REFERENCE TO RELATED APPLICATION

The present application claims priority under 35 U.S.C. § 119(a) to Korean patent application number 10-2022-0159852 filed on Nov. 25, 2022, in the Korean Intellectual Property Office, the entire disclosure of which is incorporated by reference herein.

BACKGROUND

1. Technical Field

Various embodiments of the present disclosure generally relate to an electronic device, and more particularly to a semiconductor memory device for programming or erasing select transistors used in the memory device and a method of operating the semiconductor memory device.

2. Related Art

A semiconductor memory device may have a two-dimensional (2D) structure in which strings are horizontally arranged on a semiconductor substrate. Alternatively, the semiconductor memory device may have a three-dimensional (3D) structure in which strings, i.e., serially connected transistors, are formed to be vertically stacked on a semiconductor substrate. As the semiconductor memory device having a 2D structure is reaching its physical scaling limit (i.e., limit in the degree of integration), a 3D semiconductor memory device including a plurality of memory cells vertically stacked on a semiconductor substrate has been produced.

SUMMARY

Many semiconductor memory devices, such as a NAND flash memory, are comprised of a plurality of series-connected memory cell transistors and "select transistors" located at both ends of the memory cell transistors. Various embodiments of the present disclosure are directed to a semiconductor device that is capable of reducing the time required to program or erase the select transistors of a semiconductor memory device and a method of operating the semiconductor device. As used herein and for claim construction purposes, the word "line" refers to any electrically conductive path formed in the semiconductor device and which is electrically connected to semiconductor devices formed in the device. A line can thus electrically connect transistors to each other. A line can also connect transistors to externally-accessible contact surfaces through which signals can be provided into and received from the memory device. While the word "line" may imply straight or substantially straight shape requirement, the lines referred to herein, may have shapes that are not straight and which may be, and usually are, quite circuitous.

An embodiment of the present disclosure may provide for a method of operating a semiconductor device. The method may include applying a program voltage to select lines coupled to select transistors included in a plurality of string groups, and performing a verify operation on the select transistors. Performing the verify operation may include simultaneously performing a verify check operation on first select transistors included in a first string group of the plurality of string groups, and an operation of applying a verify voltage to a select line coupled to second select transistors included in a second string group of the plurality of string groups.

An embodiment of the present disclosure may provide for a method of operating a semiconductor device. The method may include applying a program voltage to select lines coupled to select transistors included in first to N-th string groups, and performing a verify operation on the select transistors. Performing the verify operation may include simultaneously performing a verify check operation on i-th select transistors included in an i-th string group, among the first to N-th string groups, and an operation of applying a verify voltage to a select line coupled to (i+1)-th select transistors included in an (i+1)-th string group. Here, N may be a natural number equal to or greater than 2, and i may be a natural number equal to or greater than 1 and less than N.

An embodiment of the present disclosure may provide for a semiconductor device. The semiconductor device may include a first string group including first select transistors, a second string group including second select transistors, a peripheral circuit including a plurality of page buffers, each including a first latch circuit and a second latch circuit, and configured to perform a program operation on the first and second select transistors, and a control logic configured to control the program operation of the peripheral circuit. The control logic may be configured to control the peripheral circuit to apply a verify voltage to the first select transistors and then store results of verification of the first select transistors in first latch circuits of corresponding page buffers, respectively, store values, stored in the first latch circuits, in corresponding second latch circuits, respectively, and simultaneously perform an operation of storing the results of verification of the second select transistors in the first latch circuits, respectively, and a verify check operation on the first select transistors based on the values stored in the second latch circuits.

An embodiment of the present disclosure may provide for a method of operating a semiconductor device. The method may include applying an erase voltage to select transistors included in first to N-th string groups, and performing a verify operation on the select transistors. Performing the verify operation may include simultaneously performing a verify check operation on i-th select transistors included in an i-th string group, among the first to N-th string groups, and an operation of applying a verify voltage to a select line coupled to (i+1)-th select transistors included in an (i+1)-th string group. Here, N may be a natural number equal to or greater than 2, and i may be a natural number equal to or greater than 1 and less than N.

DETAILED DESCRIPTION

Specific structural or functional descriptions in the embodiments of the present disclosure introduced in this specification or application are provided as examples to describe embodiments according to the concept of the present disclosure. The embodiments according to the concept of the present disclosure may be practiced in various forms, and should not be construed as being limited to the embodiments described in the specification or application.

Figure 1:
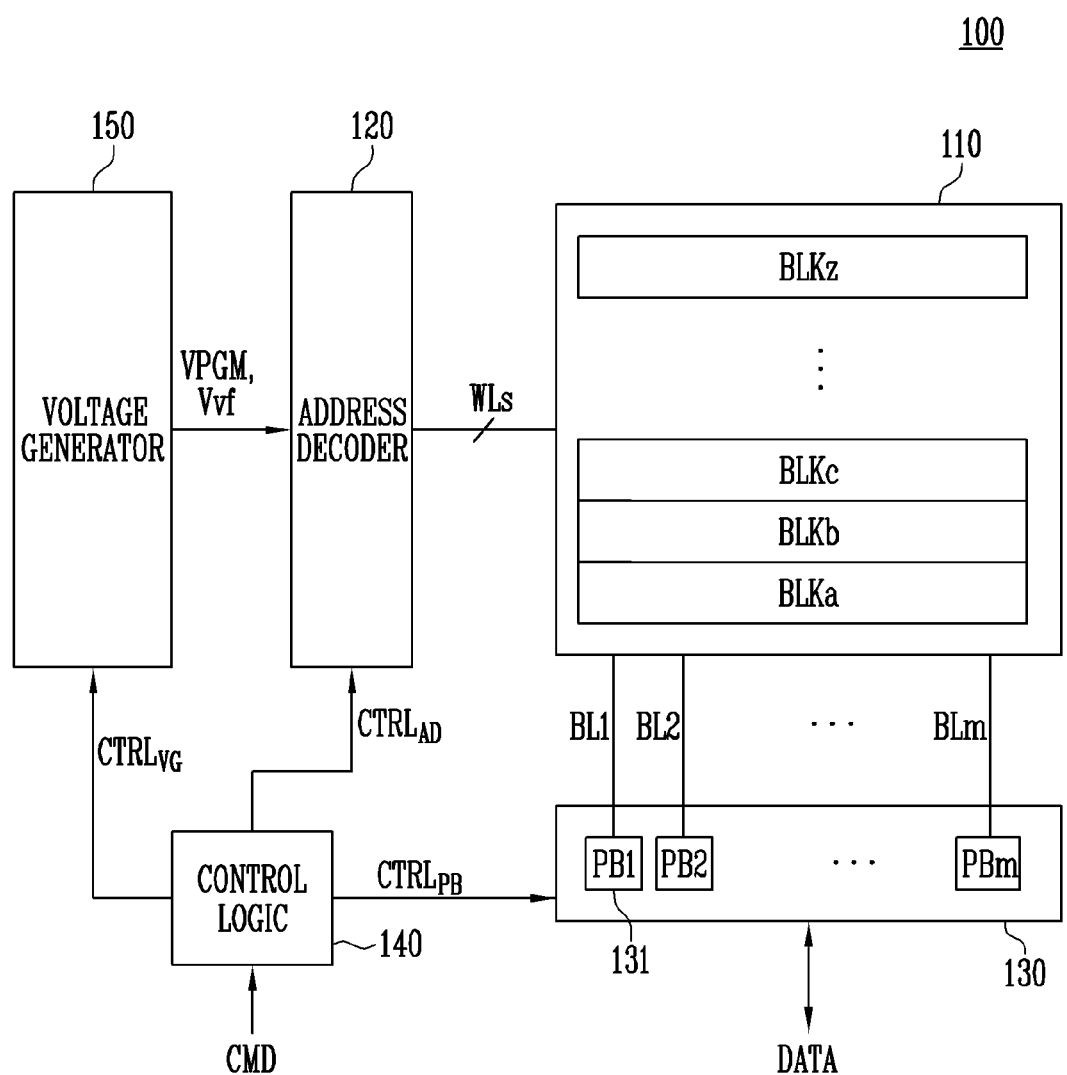
FIG. 1 is a block diagram illustrating a semiconductor memory device according to an embodiment of the present disclosure.

FIG. 1 is a block diagram illustrating a semiconductor memory device according to an embodiment of the present disclosure.

Referring to FIG. 1, a semiconductor memory device 100 may include a memory cell array 110, an address decoder 120, a read and write circuit 130, a control logic 140, and a voltage generator 150. In one embodiment, the structures depicted in FIG. 1 are preferably implemented as combinational and sequential logic devices, fabricated on the same semiconductor substrate. In another embodiment, the memory cell array 110 is fabricated on its own die while the other structures are fabricated on one or more other substrates. Regardless of where they are fabricated, such logic devices are themselves well known to those of ordinary skill in the semiconductor memory art.

The memory cell array 110 may include a plurality of memory blocks BLKa to BLKz. The memory blocks BLKa to BLKz are coupled to the address decoder 120 through word lines WLs. The memory blocks BLKa to BLKz are coupled to the read and write circuit 130 through bit lines BL1 to BLm. Each of the memory blocks BLKa to BLKz may include a plurality of memory cells. In an embodiment, the plurality of memory cells may be nonvolatile memory cells, and may be implemented as nonvolatile memory cells having a vertical channel structure.

The address decoder 120, the read and write circuit 130, and the voltage generator 150 are operated as a peripheral circuit for driving the memory cell array 110. The peripheral circuit may perform a read operation, a write operation, and an erase operation on the memory cell array 110 under the control of the control logic 140. The address decoder 120 is coupled to the memory cell array 110 through the word lines WLs. The address decoder 120 may be operated under the control of the control logic 140. In detail, the control logic 140 may transfer an address decoding control signal CTRL$_{AD}$ to the address decoder 120, and the address decoder 120 may perform a decoding operation in response to the address decoding control signal CTRL$_{AD}$.

Further, the address decoder 120 may apply a program voltage VPGM generated by the voltage generator 150 to a selected word line and apply a program pass voltage to the remaining word lines, that is, unselected word lines, during a program operation. Furthermore, the address decoder 120 may apply a verify voltage Vvf generated by the voltage generator 150 to the selected word line and apply a verify pass voltage to the remaining word lines, that is, unselected word lines, during a program verify operation.

The read and write circuit 130 includes a plurality of page buffers PB1 to PBm. The read and write circuit 130 may be operated as a "read circuit" during a read operation on the memory cell array 110 and as a "write circuit" during a write operation on the memory cell array 110. The plurality of page buffers PB1 to PBm may be coupled to the memory cell array 110 through the bit lines BL1 to BLm. The read and write circuit 130 may perform a program operation on received data DATA in response to a page buffer control signal CTRL$_{PB}$ output from the control logic 140. An embodiment of the first page buffer PB1 131, of the plurality of page buffers PB1 to PBm, will be described in detail later with reference to FIG. 6.

The control logic 140 is coupled to the address decoder 120, the read and write circuit 130, and the voltage generator 150. The control logic 140 may receive a command CMD from an external device. The control logic 140 may control the address decoder 120, the read and write circuit 130, and the voltage generator 150 to perform an operation corresponding to the received command CMD. That is, the control logic 140 may control the operation of the voltage generator 150 using a voltage generation control signal CTRL$_{VG}$. Also, the control logic 140 may control the operation of the address decoder 120 using the address decoding control signal CTRL$_{AD}$. Meanwhile, the control logic 140 may control the operations of the page buffers PB1 to PBm in the read and write circuit 130 using the page buffer control signal CTRL$_{PB}$.

The voltage generator 150 may generate a read voltage Vread and a pass voltage Vpass during a read operation in response to the voltage generation control signal CTRL$_{VG}$ output from the control logic 140. The voltage generator 150 may generate various operating voltages. For example, the voltage generator 150 may generate the program voltage VPGM used for a program operation and a verify voltage Vvf used for a program verify voltage. Furthermore, the voltage generator 150 may also generate the program pass voltage and the verify pass voltage.

Figure 2:
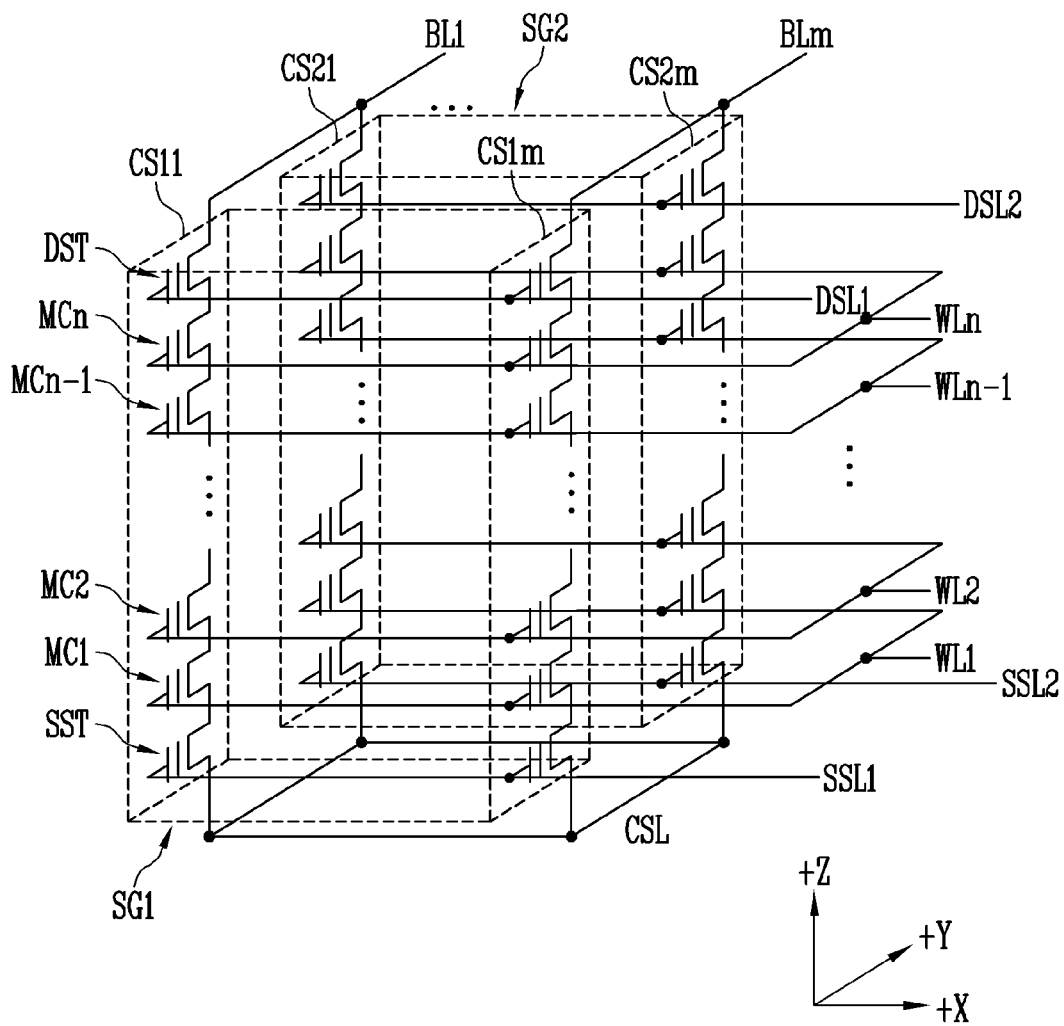
FIG. 2 is a circuit diagram illustrating any one memory block BLKa of memory blocks BLKa to BLKz of FIG. 1.

FIG. 2 is a circuit diagram illustrating any one memory block BLKa of memory blocks BLKa to BLKz of FIG. 1.

Referring to FIG. 2, the memory block BLKa may include a plurality of cell strings CS11 to CS1m and CS21 to CS2m. In the memory block BLKa, m cell strings may be arranged in a row direction (i.e., a positive (+) X direction). In FIG. 2, two cell strings are illustrated as being arranged in a column direction (i.e., a positive (+) Y direction). However, this illustration is made for convenience of description, and it will be understood that three or more cell strings may be arranged in the column direction.

Each of the plurality of cell strings CS11 to CS1m and CS21 to CS2m includes at least one source select transistor SST, first to n-th memory cells MC1 to MCn, and at least one drain select transistor DST. The source select transistor SST in each cell string is coupled between a common source line CSL and the memory cells MC1 to MCn.

In an embodiment, the source select transistors of cell strings arranged in the same row are coupled to a source select line extending in a row direction, and the source select transistors of cell strings arranged in different rows are coupled to different source select lines. In FIG. 2, the source select transistors of the cell strings CS11 to CS1m in a first row are coupled to a first source select line SSL1. The source select transistors of the cell strings CS21 to CS2m in a second row are coupled to a second source select line SSL2.

In an embodiment, the source select transistors of the cell strings CS11 to CS1m and CS21 to CS2m may be coupled in common to one source select line.

The first to n-th memory cells MC1 to MCn in each cell string are coupled between the source select transistor SST and the drain select transistor DST. Gates of the first to n-th memory cells MC1 to MCn in each cell string are coupled to first to n-th word lines WL1 to WLn, respectively.

The drain select transistor DST of each cell string is coupled between the corresponding bit line and the memory cells MC1 to MCn. The drain select transistors DST of cell strings arranged in the row direction are coupled to a drain select line extending in the row direction. The drain select transistors of the cell strings CS11 to CS1m in the first row are coupled to a first drain select line DSL1. The drain select transistors of the cell strings CS21 to CS2m in the second row are coupled to a second drain select line DSL2.

Cell strings arranged in the column direction may be coupled to bit lines extending in the column direction. In FIG. 2, the cell strings CS11 and CS21 in a first column are coupled to a first bit line BL1. The cell strings CS1m and CS2m in an m-th column are coupled to an m-th bit line BLm.

Memory cells coupled to the same word line in cell strings arranged in the row direction form one page. For example, memory cells coupled to the first word line WL1, among the cell strings CS11 to CS1m in the first row, form one page. Memory cells coupled to the first word line WL1, among the cell strings CS21 to CS2m in the second row, form one additional page. Cell strings arranged in the direction of one row may be selected by selecting any one of the drain select lines DSL1 and DSL2. One page may be selected from the selected cell strings by selecting any one of the word lines WL1 to WLn.

In FIG. 2, the memory block BLKa may include two string groups. The string groups, SG1 and SG2, comprise cells strings depicted as being "within" two, rectangular parallelepipeds formed by broken lines, spaced-apart from each other along the Y axis and identified by reference numerals SG1 and SG2. String group SG1 is thus comprised of cell strings CS11 to CS1m. String group SG2 is comprised of cell strings CS21 to CS2m. In the present specification, each string group SG1 and SG2, may be defined as cell strings which share a drain select line or a source select line with each other. In FIG. 2, the transistors of string group SG1 share drain select line DSL1 and share source select line SSL1. The transistors of string group SG2 share drain select line DSL2 and share source select line SSL2.

In detail, the memory block BLKa of FIG. 2 includes two string groups arranged in a +Y direction. Each string group includes cell strings arranged in a +X direction. That is, the first string group may include the cell strings CS11 to CS1m in the first row, and the second string group may include the cell strings CS21 to CS2m in the second row. As illustrated in FIG. 2, the cell strings CS11 to CS1m included in the first string group may be coupled in common to the first drain select line DSL1 and the first source select line SSL1. Meanwhile, the cell strings CS21 to CS2m included in the second string group may be coupled in common to the second drain select line DSL2 and the second source select line SSL2.

The memory block illustrated in FIG. 2 may include two string groups, but, unlike this embodiment, the memory block may be configured to include four string groups. Hereinafter, a description will be made based on an embodiment in which each of the memory blocks of the semiconductor memory device includes four string groups for convenience of description.

Figure 3:
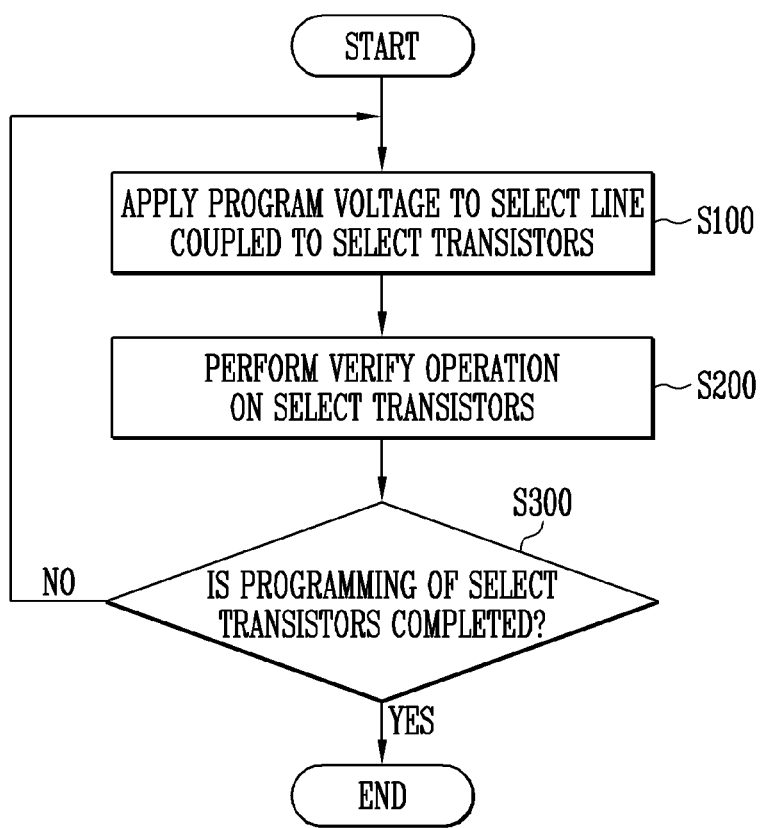
FIG. 3 is a flowchart illustrating a method of operating a semiconductor memory device according to an embodiment of the present disclosure.

FIG. 3 is a flowchart illustrating a method of operating a semiconductor memory device according to an embodiment of the present disclosure. The present invention is applicable to both program operation or erase operation of select transistors included in a semiconductor memory device. For the sake of simplicity, the present invention will be described hereinafter focusing on the program operation of the selection transistor.

Referring to FIG. 3, the method of operating the semiconductor memory device according to an embodiment of the present disclosure may include applying a program voltage to a select line coupled to select transistors at step S100, performing a verify operation on the select transistors at step S200, and determining whether programming of the select transistors has been completed at step S300.

At step S100, the threshold voltages of drain select transistors as well as source select transistors may be increased by applying the program voltage to a drain select line coupled to the drain select transistors or applying the program voltage to a source select line coupled to the source select transistors. Describing the erasing operation to which the present invention is applied, the threshold voltage of the selection transistors may be lowered instead of the step S100. In this case, a relatively high erase voltage may be applied to the common source line CSL or bit lines BL1-BLm and a relatively low erase allowable voltage may be applied to the select lines connected to the select transistors to be erased. For example, if the drain select transistors are targeted for erasure, the erase allowable voltage may be applied to drain select line. In this case, an erase pass voltage may be applied to the source select line and word lines. The erase pass voltage may be higher than the erase allowable voltage. This allows the threshold voltage of the drain select transistors connected to the drain select line to decrease, while the threshold voltage of the other source select transistors and memory cells may not decrease. For the sake of simplicity, the following description is based on the program operation of the drain select transistors.

At step S200, the verify operation may be performed on the drain select transistors, DST. In the present specification, the verify operation on the drain select transistors, DST may include a process of checking respective threshold voltages of the drain select transistors DST and determining whether the number of drain select transistors DST having threshold voltages higher than a verify voltage is greater than a preset reference value. When the number of drain select transistors DST having threshold voltages higher than the verify voltage is greater than the preset reference value, it may be determined that programming using the drain select transistors DST is completed (in the case of Yes at step S300). Therefore, in this case, the program operation using the drain select transistors is terminated.

When the number of drain select transistors DST having threshold voltages higher than the verify voltage is less than or equal to the preset reference value, it may be determined that programming using the drain select transistors is not yet completed (in the case of No at step S300). In this case, the process returns to step S100 and continues to perform the program operation on the drain select transistors.

Figure 4:
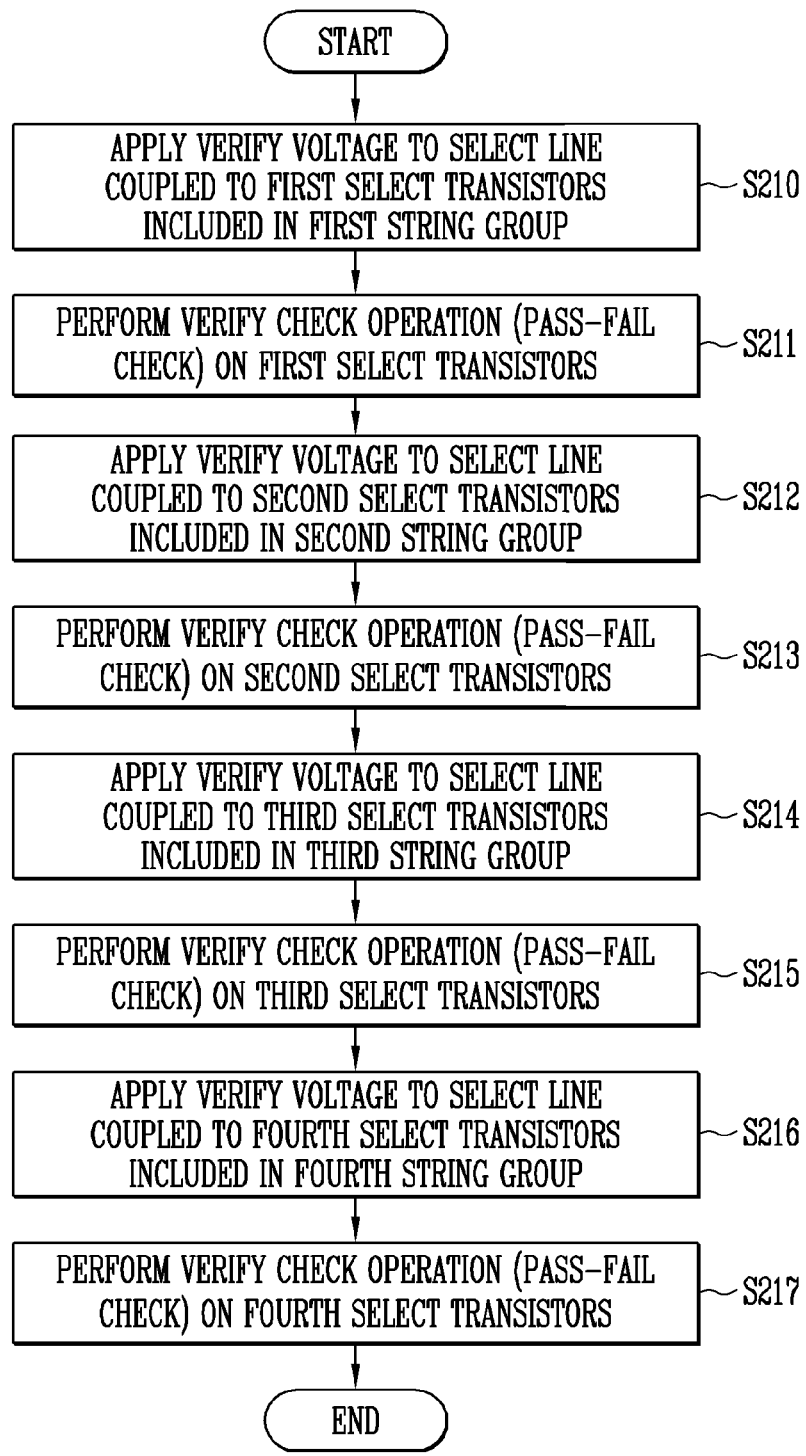
FIG. 4 is a flowchart illustrating an embodiment of step S200 of FIG. 3.

FIG. 4 is a flowchart illustrating an embodiment of step S200 of FIG. 3. That is, FIG. 4 illustrates an example of step S200 of performing the verify operation on select transistors.

Referring to FIG. 4, step S200 may include applying a verify voltage to a select line coupled to first select transistors included in a first string group, (e.g., SG1) at step S210, performing a verify check operation on the first select transistors at step S211, applying the verify voltage to a select line coupled to second select transistors included in a second string group, (e.g., SG2) at step S212, performing a verify check operation on the second select transistors at step S213, applying the verify voltage to a select line coupled to third select transistors included in a third string group, (A third string group is omitted from FIG. 2 in the interest of clarity.) at step S214, performing a verify check operation on the third select transistors at step S215, applying the verify voltage to a select line coupled to fourth select transistors included in a fourth string group at step S216, and performing a verify check operation on the fourth select transistors at step S217. Hereinafter, a description will be made based on the verify operation on the drain select transistors.

At step S210, the verify voltage may be applied to the select line coupled to the first select transistors included in the first string group. By means of this operation, bit data indicating whether the threshold voltages of the first select transistors included in the first string group are higher than the verify voltage may be stored in a first latch circuit in the corresponding page buffer. In an embodiment, the first select transistors may be the drain select transistors, DST, included in the first string group. In an embodiment, the first select transistors may be the source select transistors, SST, included in the first string group.

At step S211, the verify check operation on the first select transistors may be performed based on the bit data that is stored in the first latch circuit in the page buffer and that indicates whether the threshold voltages of the first select transistors included in the first string group are higher than the verify voltage. In detail, at step S211, whether the number of select transistors having threshold voltages higher than the verify voltage, among the first select transistors, is greater than the preset reference value may be determined. At step S211, when the number of select transistors having threshold voltages higher than the verify voltage among the first select transistors is greater than the preset reference value, the verify operation on the first select transistors is considered as having passed. That is, the program operation on the first select transistors is considered completed. At step S211, when the number of select transistors having threshold voltages higher than the verify voltage is less than or equal to the preset reference value, the verify operation on the first select transistors is considered as having failed. That is, the program operation on the first select transistors is considered not completed or incomplete.

That is, by means of steps S210 and S211, the verify operation on the select transistors included in the first string group is performed.

Step S212 is identical to step S210, except that the verify voltage application operation is performed on the second select transistors, not on the first select transistors. Step S213 is identical to step S211, except that the operation is performed on the second select transistors, not the first select transistors. That is, by means of steps S212 and S213, the verify operation on the select transistors included in the second string group is performed.

Step S214 is identical to step S210, except that the verify voltage application operation is performed on the third select transistors, not the first select transistors. Step S215 is identical to step S211, except that the verify operation is performed on the third select transistors, not the first select transistors. That is, by means of steps S214 and S215, the verify operation on the select transistors included in the third string group is performed.

Step S216 is identical to step S210, except that the verify voltage application operation is performed on the fourth select transistors, not the first select transistors. Step S217 is identical to step S211, except that the verify operation is performed on the fourth select transistors, not the first select transistors. That is, by means of steps S216 and S217, the verify operation on the select transistors included in the fourth string group is performed.

Referring to FIG. 4, it can be seen that the verify operation on the first select transistors included in the first string group at steps S210 and S211, the verify operation on the second select transistors included in the second string group at steps S212 and S213, the verify operation on the third select transistors included in the third string group at steps S214 and S215, the verify operation on the fourth select transistors included in the fourth string group at steps S216 and S217 are performed sequentially, i.e., one after another. The reason for this is that the first to fourth select transistors included in the first to fourth string groups, respectively, are coupled to the same bit lines to share the same page buffers with each other. Therefore, the verify operations on the first to fourth drain select transistors cannot be simultaneously performed, but are instead sequentially performed, as illustrated in FIG. 4. Therefore, a lot of time is consumed in step S200 of performing the verify operations on the select transistors. As a result, the time required to program the select transistors is increased.

In accordance with an embodiment of the present disclosure, the verify check operation, (or simply the verify operation) that is, a pass-fail (PF) check operation, on the first select transistors included in the first string group, and an operation of applying the verify voltage to the select line coupled to the second transistors included in the second string group are performed substantially simultaneously. Therefore, the time required for step S200 of performing the verify operation on the select transistors may be reduced, with the result that a program speed for the select transistors may be improved.

Figure 5:
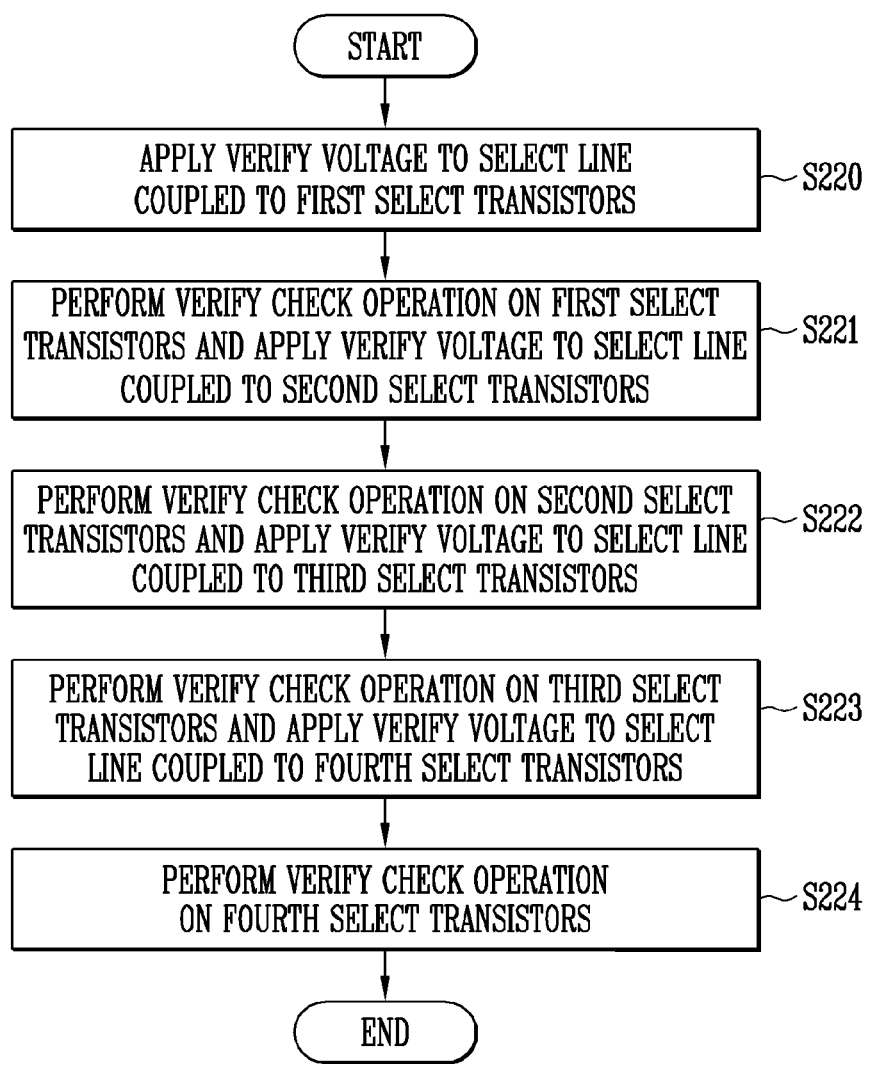
FIG. 5 is a flowchart illustrating an embodiment of step S200 of FIG. 3.

FIG. 5 is a flowchart illustrating an embodiment of step S200 of FIG. 3.

Referring to FIG. 5, step S200 may include applying a verify voltage to a select line coupled to first select transistors included in a first string group at step S220, performing a verify check operation on the first select transistors and applying the verify voltage to a select line coupled to second select transistors included in a second string group at step S221, performing a verify check operation on the second select transistors and applying the verify voltage to a select line coupled to third select transistors included in a third string group at step S222, performing a verify check operation on the third select transistors and applying the verify voltage to a select line coupled to fourth select transistors included in a fourth string group at step S223, and performing a verify check operation on the fourth select transistors at step S224. Hereinafter, a description will be made based on the verify operation on drain select transistors.

At step S220, the verify voltage may be applied to the select line coupled to the first select transistors included in the first string group. By means of this operation, bit data indicating whether the threshold voltages of the first select transistors included in the first string group are higher than the verify voltage may be stored in a first latch circuit in the corresponding page buffer. Step S220 of FIG. 5 may be substantially identical to step S210 of FIG. 4.

At step S221, the verify check operation on the first select transistors may be performed based on bit data that is stored in a second latch circuit in the page buffer and that indicates whether the threshold voltages of the first select transistors included in the first string group are higher than the verify voltage, and bit data indicating whether the threshold voltages of the second select transistors included in the second string group are higher than the verify voltage by applying the verify voltage to the select line coupled to the second select transistors included in the second string group may be stored in the first latch circuit in the corresponding page buffer. The first and second latch circuits of the page buffer will be described in detail later with reference to FIG. 8.

At step S221, the verify check operation on the first select transistors and the operation of applying the verify voltage to the select line coupled to the second select transistors included in the second string group may be substantially simultaneously performed. That is, the verify check operation on the first select transistors and the operation of applying the verify voltage to the select line coupled to the second select transistors included in the second string group may temporally overlap each other. In other words, before the verify check operation on the first select transistors is terminated, the operation of applying the verify voltage to the select line coupled to the second select transistors included in the second string group may start.

In accordance with an embodiment of the present disclosure, the verify check operation on the first select transistors may be performed based on data stored in the second latch circuit in the page buffer. Further, bit data indicating whether the threshold voltages of the second select transistors included in the second string group are higher than the verify voltage by applying the verify voltage to the select line coupled to the second select transistors is stored in the first latch circuit. Therefore, the verify check operation on the first select transistors and the operation of applying the verify voltage to the select line coupled to the second select transistors included in the second string group may be simultaneously performed or they can be substantially simultaneously performed. Step S221 will be described in detail later with reference to FIGS. 7A to 7C.

Steps S222 and S223 are substantially identical to step S221, except that select transistors are changed to perform operations. Therefore, repeated descriptions of steps S222 and S223 will be omitted in the interest of brevity. Meanwhile, at step S224, the verify check operation on the fourth select transistors included in the fourth string group may be performed based on bit data that is stored in the second latch circuit in the page buffer and that indicates whether the threshold voltages of the fourth select transistors are higher than the verify voltage.

As described above with reference to FIG. 5, in accordance with an embodiment of the present disclosure, a verify check operation (pass-fail check operation) on i-th select transistors included in an i-th string group and an operation of applying a verify voltage to a select line coupled to (i+1)-th select transistors included in an (i+1)-th string group may be substantially simultaneously performed. Therefore, the time required for step S200 of performing the verify operation on the select transistors may be reduced, with the result that a program speed for the select transistors may be improved.

As described above, the present invention can be applied not only to program operation but also to erase operation. In this case, in the erase verification operation for the select transistors, a verify check operation (pass-fail check operation) on i-th select transistors included in an i-th string group and an operation of applying a verify voltage to a select line coupled to (i+1)-th select transistors included in an (i+1)-th string group may be substantially simultaneously performed. Thus, the erase speed for the select transistors may be improved.

Figure 6:
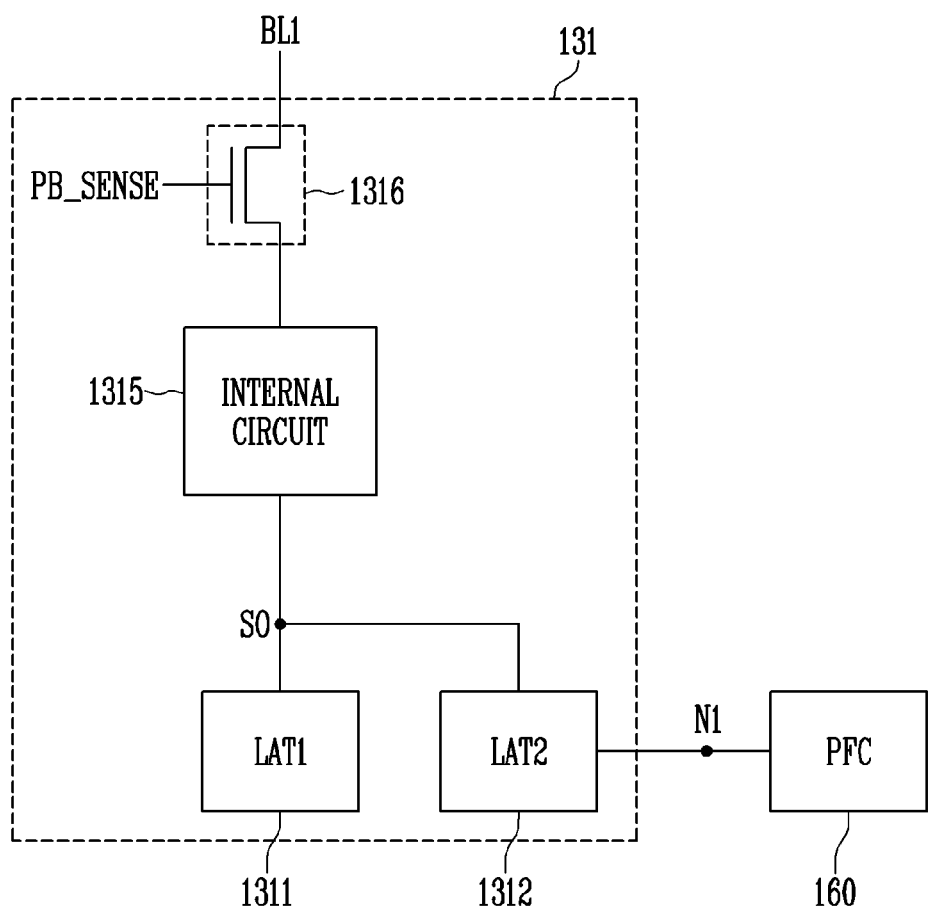
FIG. 6 is a diagram illustrating an example of a page buffer 131 according to an embodiment of the present disclosure.

FIG. 6 is a diagram illustrating an example of the page buffer 131 according to an embodiment of the present disclosure.

In detail, the page buffer 131 is an embodiment of the page buffer PB1 131 shown in FIG. 1, which is operatively coupled to the first bit line BL1. As described above, four cell strings included in the first to fourth string groups, respectively, may be coupled in common to the first bit line BL1, and may share the page buffer PB1 131 with each other. Further, the page buffer PB1 131 may be operated responsive to the PB_SENSE signal. Other page buffers PB2 to PBm may be configured to have the same configuration as the page buffer 131 illustrated in FIG. 6.

Referring to FIG. 6, the page buffer 131 may include a bit line connection transistor 1316, an internal circuit 1315, a first latch circuit LAT1 1311, and a second latch circuit LAT2 1312. The first latch circuit LAT1 1311 and the second latch circuit LAT2 1312 may be coupled to the internal circuit 1315 through a node SO, and may be used for a verify operation. Also, the bit line connection transistor 1316 may control a connection between the bit line BL1 and the internal circuit 1315. The internal circuit 1315 may be coupled to the first bit line BL1 through the bit line connection transistor 1316 and may perform a verify operation on a memory cell coupled to the first bit line BL1. The internal circuit 1315 may include circuits well known to those of ordinary skill in the art, which can determine or measure the magnitude of the threshold voltages of the memory cells coupled to the bit line BL1 and store the determination results in the first latch circuit LAT1 1311.

In an embodiment of the present disclosure, of the plurality of latch circuits LAT1 1311 and LAT2 1312, the first latch LAT1 1311 may be used to store data corresponding to the results of sensing whether the threshold voltages of respective select transistors are greater than the verify voltage. That is, the results of the sensing operation performed by the internal circuit 1315 may be stored in the first latch circuit LAT1 1311. Meanwhile, the second latch circuit LAT2 1312 may be used to perform a verify check operation, that is, a pass-fail check operation, on the select transistors. For this operation, the second latch circuit LAT2 1312 may be coupled to a pass-fail check circuit 160 through a first node N1. The pass-fail check circuit 160 may be included in the peripheral circuit of the semiconductor memory device 100.

In FIG. 6, although only the latch circuits 1311 and 1312 and the bit line connection transistor 1316 are illustrated as components of the first page buffer PB1 131, this illustration is provided for convenience of description and other components are omitted. That is, the first page buffer PB1 may further include various transistors and latch circuits, in addition to the latch circuits 1311 and 1312 and the bit line connection transistor 1316, according to design.

When a verify operation on the select transistors is performed, a value indicating whether the threshold voltage of each select transistor coupled to the first bit line BL1 is greater than a verify voltage may be stored in the first latch circuit 1311. For example, when the threshold voltage of each select transistor coupled to the first bit line BL1 is lower than the verify voltage, a value of "0" may be stored in the first latch circuit 1311. As programming progresses, when the threshold voltage of the corresponding select transistor coupled to the first bit line BL1 becomes greater, or is greater than the verify voltage, a value of "1" may be stored in the first latch circuit 1311.

Those of ordinary skill in the art will recognize that an alternate and equivalent embodiment stores a value of "1" to indicate that a threshold voltage is lower than the verify voltage. In which case, the alternate and equivalent embodiment stores a value of "0" to indicate that a threshold voltage is greater than the verify voltage.

Meanwhile, according to the illustration in FIG. 6, the pass-fail check circuit 160 is illustrated as being coupled to the first node N1 of the first page buffer PB1. Although not illustrated in FIG. 6, the pass-fail check circuit 160 is also coupled to the second to m-th page buffers PB2 to PBm. In detail, second latch circuits LAT2 included in the second to m-th page buffers PB2 to PBm may be coupled to the pass-fail check circuit 160 through second to m-th nodes N2 to Nm corresponding thereto. Examples of the configuration and the operation of the pass-fail check circuit 160 will be described in detail later with reference to FIG. 9.

Figure 7A:
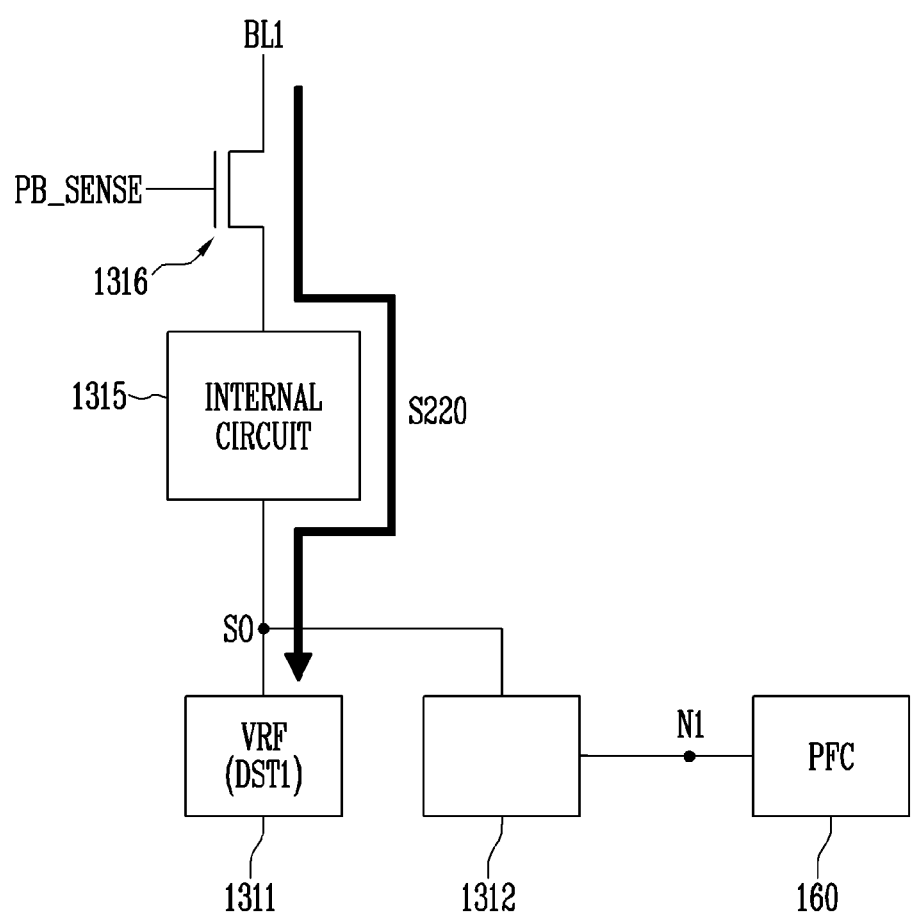
FIGS. 7A, 7B, and 7C are diagrams for explaining steps illustrated in FIG. 5.
Figure 7B:
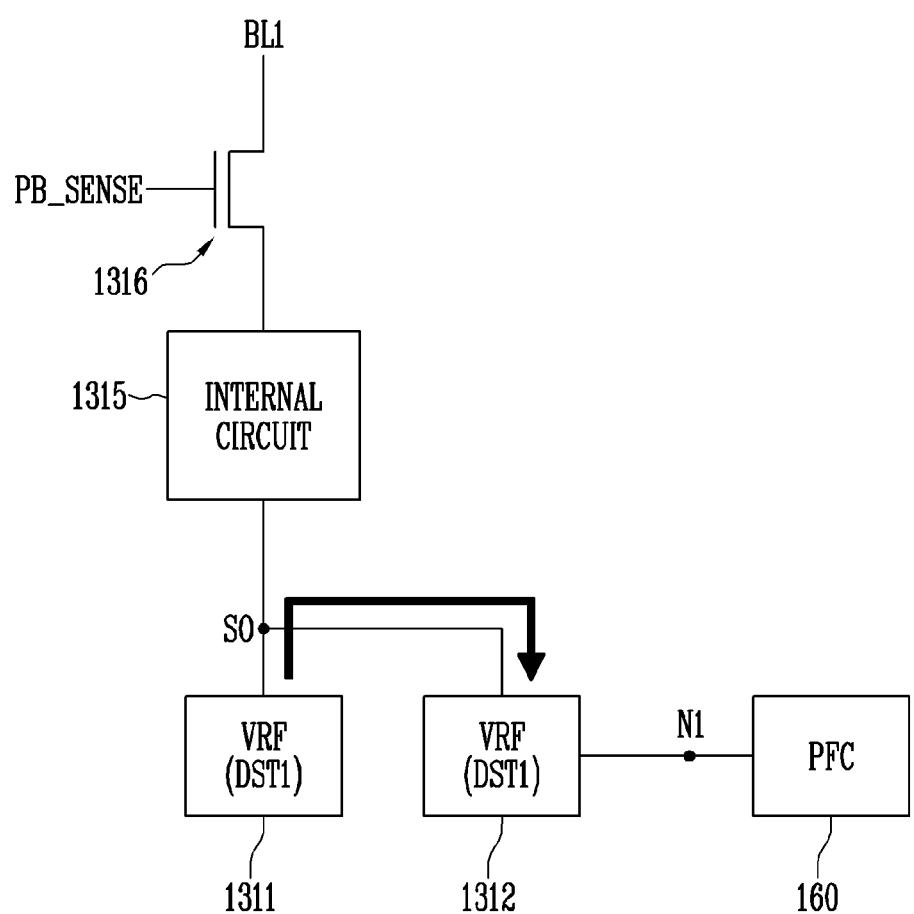
Figure 7C:
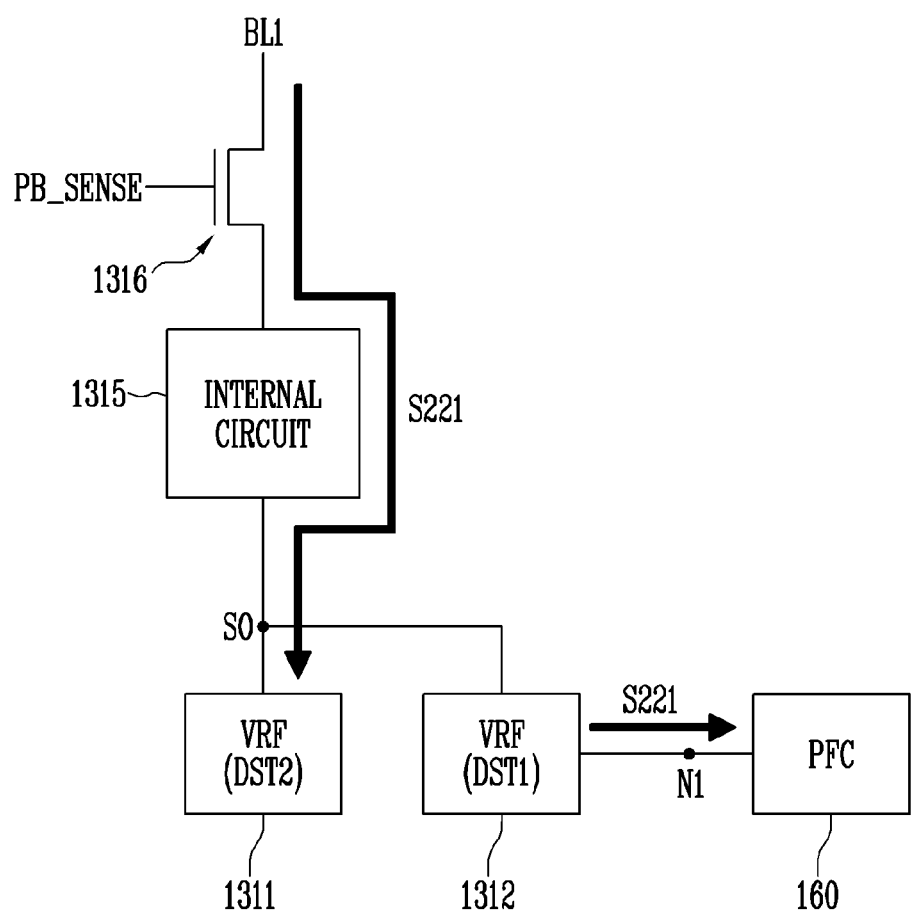

FIGS. 7A, 7B, and 7C are diagrams for explaining steps illustrated in FIG. 5.

Referring to FIG. 7A, step S220 of applying a verify voltage to a select line coupled to first select transistors is illustrated. At step S220, the verify voltage may be applied to a drain select line DSL1 coupled to the first select transistor, for example, a first drain select transistor DST1. Accordingly, the internal circuit 1315 may sense the threshold voltage of the first drain select transistor DST1 included in the first string group, and may store bit data indicating a verification result VRF in the first latch circuit 1311. When the threshold voltage of the first drain select transistor DST1 is lower than the verify voltage, a value of "0" may be stored, as bit data indicating the verification result VRF, in the first latch circuit 1311. On the other hand, when the threshold voltage of the first drain select transistor DST1 is higher than the verify voltage, a value of "1" may be stored, as the bit data indicating the verification result VRF, in the first latch circuit 1311.

Referring to FIG. 7B, an operation of shifting the bit data that is stored in the first latch circuit 1311 and that indicates the threshold voltage verification result VRF of the first drain select transistor DST1 to the second latch circuit 1312 is illustrated. In order to simultaneously perform a verify check operation (pass-fail check operation) on the first drain select transistor DST1 and an operation of applying a verify voltage to a second drain select line DSL2 coupled to a second drain select transistor DST2, the bit data stored in the first latch circuit 1311 may be shifted to the second latch circuit 1312. The operation of shifting the bit data stored in the first latch circuit 1311 to the second latch circuit 1312 may be performed for a relatively short time, compared to the verify check operation on the first drain select transistor DST1 or the operation of applying the verify voltage to the second drain select line DSL2 coupled to the second drain select transistor DST2. A detailed embodiment of the operation of shifting the bit data stored in the first latch circuit 1311 to the second latch circuit 1312 will be described in detail later with reference to FIG. 8.

Referring to FIG. 7C, step S221 of performing the verify check operation on the first select transistors and applying the verify voltage to the select line coupled to the second select transistors included in the second string group is illustrated. As described above with reference to FIG. 7B, bit data indicating the threshold voltage verification result VRF of the drain select transistor DST1 has been shifted to the second latch circuit 1312, and thus the verify check operation on the first select transistors may be performed based on the bit data stored in the second latch circuit 1312. In detail, the pass-fail check circuit 160 may perform a pass-fail check operation on the drain select transistors included in the first string group based on the bit data stored in the second latch circuit 1312.

At the same time that the verify check operation on the first select transistors is performed, or at substantially the same time, the operation of applying the verify voltage to the select line coupled to the second select transistors may be performed. In detail, at step S221, the verify voltage may be applied to the drain select line DSL2 coupled to the second select transistor, for example, the second drain select transistor DST2. Accordingly, the internal circuit 1315 may sense the threshold voltage of the second drain select transistor DST2 included in the second string group, and may store bit data indicating a verification result VRF in the first latch circuit 1311. When the threshold voltage of the second drain select transistor DST2 is lower than the verify voltage, a value of "0" may be stored, as bit data indicating the verification result VRF, in the first latch circuit 1311. On the other hand, when the threshold voltage of the second drain select transistor DST2 is higher than the verify voltage, a value of "1" is stored, as the bit data indicating the verification result VRF, in the first latch circuit 1311.

Although the operation at step S221 is illustrated in FIG. 7C, steps S222 and S223 may also be performed in the same manner as that illustrated in FIG. 7C.

In this way, in accordance with the semiconductor memory device and the method of operating the semiconductor memory device according to embodiments of the present disclosure, bit data indicating the results of verification VRF on i-th select transistors included in an i-th string group (where i is a natural number equal to or greater than 1), among a plurality of string groups, may be shifted from the first latch circuits LAT1 1311 of respective page buffers to the second latch circuits LAT2 1312. Thereafter, the verify check operation (pass-fail check operation) on the i-th select transistors included in the i-th string group and the operation of applying the verify voltage to a select line coupled to (i+1)-th select transistors included in an (i+1)-th string group may be substantially simultaneously performed.

The operation illustrated in FIG. 7B, that is, the operation of shifting bit data that is stored in the first latch circuit 1311 and that indicates the threshold voltage verification result VRF of the first drain select transistor DST1 to the second latch circuit 1312 may be performed between steps S220 and S221 of FIG. 5.

Figure 8:
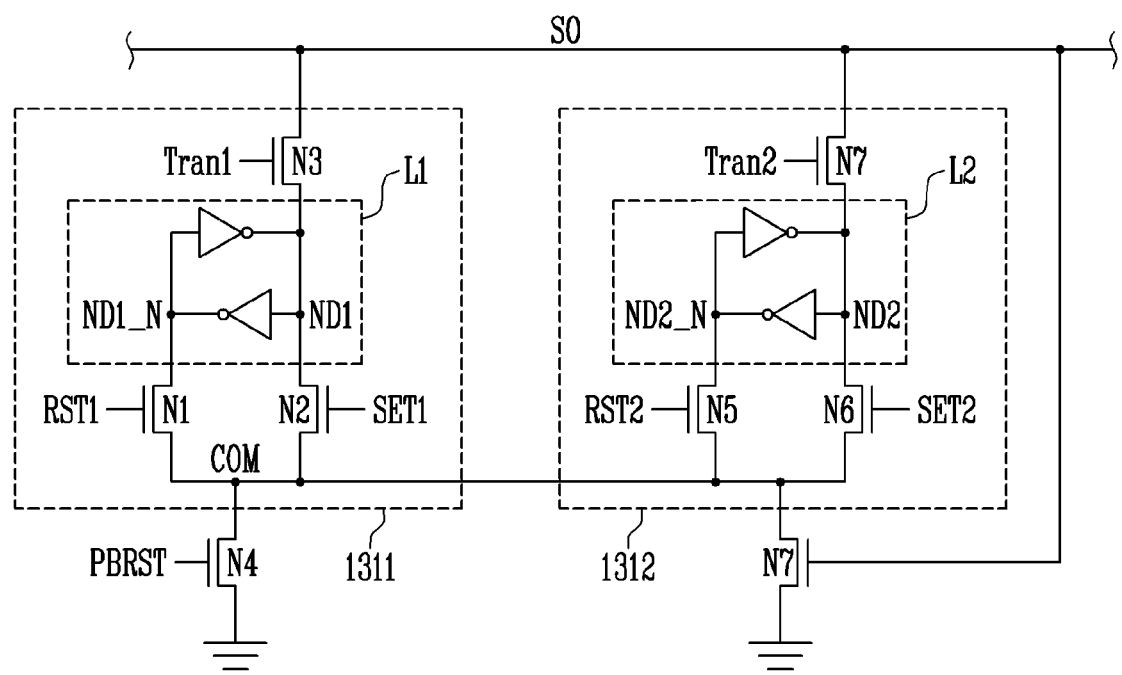
FIG. 8 is a diagram for explaining an embodiment of an operation of shifting bit data stored in a first latch circuit 1311 to a second latch circuit 1312.

FIG. 8 is a diagram for explaining an embodiment of an operation of shifting bit data stored in the first latch circuit 1311 to the second latch circuit 1312. Referring to FIG. 8, an example of a circuit diagram of the first latch circuit 1311 and the second latch circuit 1312 coupled to a node SO is illustrated.

The first latch circuit 1311 is coupled to the node SO. The first latch circuit 1311 includes first to third NMOS transistors N1 to N3 and a first latch L1. Also, the first latch circuit 1311 is coupled to a fourth NMOS transistor N4 through a node COM. Meanwhile, the second latch circuit 1312 includes fifth to seventh NMOS transistors N5 to N7 and a second latch L2. Also, the second latch circuit 1312 is coupled to the fourth NMOS transistor N4 through the node COM.

The first NMOS transistor N1 is coupled between a node ND1_N of the first latch L1 and the node COM and is controlled in response to a signal RST1. The second NMOS transistor N2 is coupled between a node ND1 of the first latch L1 and the node COM and is controlled in response to a signal SET1. The third NMOS transistor N3 is coupled between the node SO and the node ND1 of the first latch L1 and is controlled in response to a signal Tran1.

The fourth NMOS transistor N4 is coupled between the node COM and a ground and is controlled in response to a signal PBRST.

The fifth NMOS transistor N5 is coupled between a node ND2_N of the second latch L2 and the node COM and is controlled in response to a signal RST2. The sixth NMOS transistor N6 is coupled between the node ND2 of the second latch L2 and the node COM and is controlled in response to a signal SET2. The seventh NMOS transistor N7 is coupled between the node SO and the node ND2 of the second latch L2 and is controlled in response to a signal Tran2.

The seventh NMOS transistor N7 is coupled between the node COM and the ground and is controlled in response to the voltage of the node SO.

Hereinafter, the operation of shifting data stored in the first latch circuit 1311 to the second latch circuit 1312 will be described in detail with reference to FIG. 8.

The operation of shifting the data stored in the first latch circuit 1311 to the second latch circuit 1312 may be performed by transferring the voltage value of the node ND1 to the node ND2. The step of transferring the voltage value of the node ND1 to the node ND2 may be performed through the following process.

First, through initialization, the node ND2 may have a low value indicating "0", that is, zero volts, a ground potential or other reference voltage value. This may be performed by turning on the fourth NMOS transistor N4 and the sixth NMOS transistor N6 in response to the control signals PBRST and SET2. In this state, when the control signal Tran1 applied to a gate of the third NMOS transistor N3 is activated to a high value, the third NMOS transistor N3 may be turned on, thus transferring the voltage value of the node ND1 to the node SO. When the control signal Tran1 is deactivated to a low value, the third NMOS transistor N3 is turned off, whereby the node SO may float and the voltage of the node SO may be maintained.

Thereafter, the signal RST2 applied to the gate of the fifth NMOS transistor N5 is activated to a high value, and thus the fifth NMOS transistor N5 is turned on. Then, depending on the voltage of the node SO, the seventh NMOS transistor N7 may be selectively turned on. Accordingly, the voltage value of the node ND1 may be transferred to the node ND2. Hereinafter, the cases where the values of the node ND1 are a low value and a high value will be separately described in detail.

When the voltage of the node ND1 is a low value, the voltage of the node SO is also maintained at a low value. In this case, the seventh NMOS transistor N7 may remain turned off. When the fifth NMOS transistor N5 is turned on in the state in which the seventh NMOS transistor N7 is turned off, the voltage of the node ND2_N is not changed. As described above, the node ND2 has a low value indicating "0", that is a ground voltage value through initialization, whereby the voltage of the node ND2 is also maintained. That is, when the voltage of the node ND1 is a low value, the voltage of the node ND2 is also maintained at a low value.

When the voltage of the node ND1 is a high value, the voltage of the node SO is also maintained at a high value. In this case, the seventh NMOS transistor N7 may remain turned on. When the fifth NMOS transistor N5 is turned on in the state in which the seventh NMOS transistor N7 is turned on, the voltage of the node ND2_N is changed to a low value. Accordingly, the voltage of the node ND2 is changed to a high value. That is, when the voltage of the node ND1 is a high value, the voltage of the node ND2 is also changed to a high value.

In this manner, the data stored in the first latch circuit 1311 may be shifted to the second latch circuit 1312.

Figure 9:
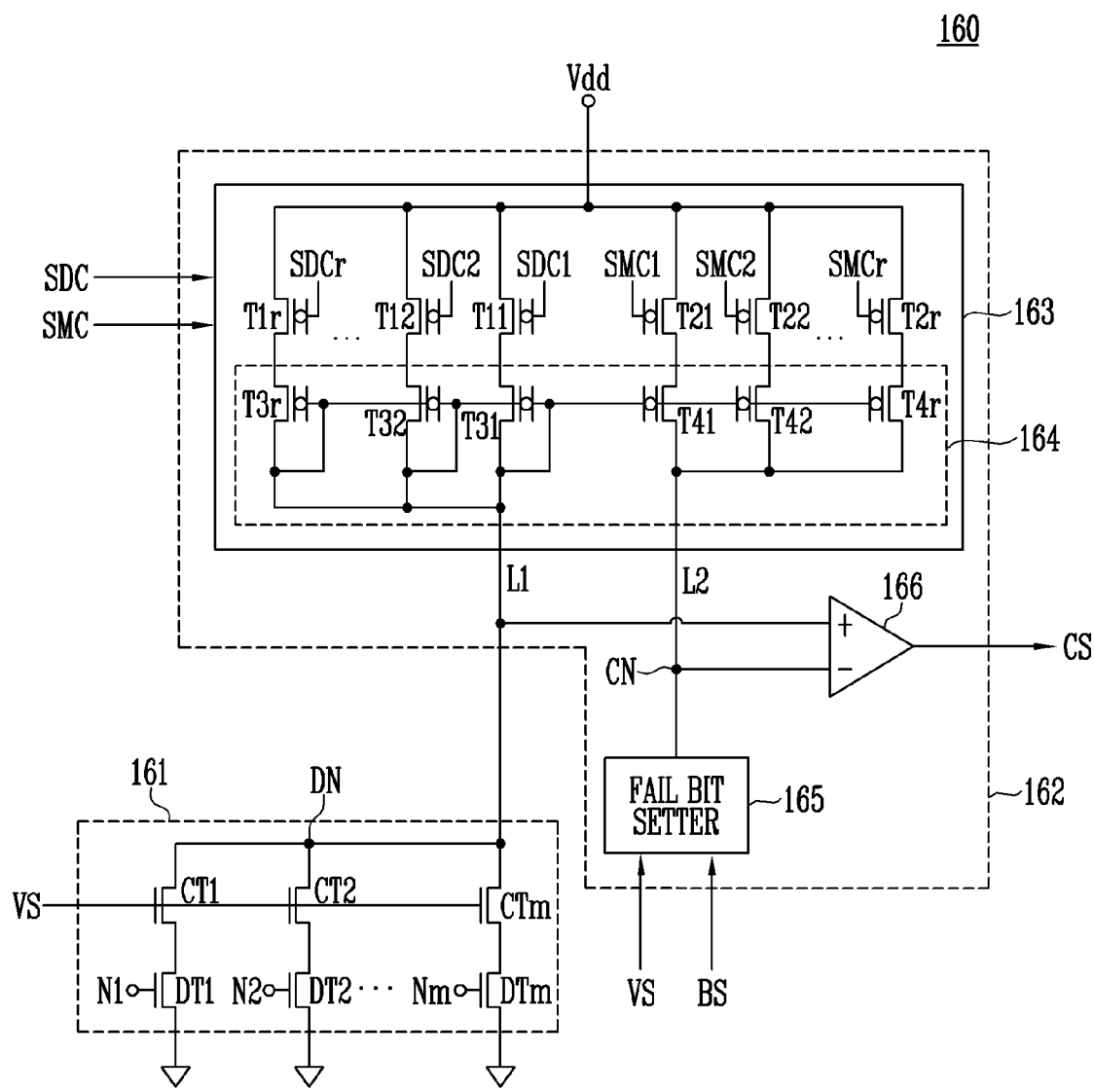
FIG. 9 is a circuit diagram illustrating an embodiment of a pass-fail check circuit.

FIG. 9 is a circuit diagram illustrating an embodiment of a pass-fail check circuit.

Referring to FIG. 9, the pass-fail check circuit 160 may include a voltage setter 161 and a voltage comparator 162. The voltage setter 161 may include a plurality of control transistors CT1 to CTm and a plurality of sensing transistors DT1 to DTm.

One control transistor (e.g., CT1) and one sensing transistor (e.g., DT1) may be coupled in series to each other between a sensing node DN and a reference node. The plurality of control transistors CT1 to CTm and the plurality of sensing transistors DT1 to DTm may be coupled in parallel to each other between the sensing node DN and the reference node. The plurality of control transistors CT1 to CTm and the plurality of sensing transistors DT1 to DTm may provide paths through which current flowing through a first line L1 is discharged to the reference node.

The plurality of control transistors CT1 to CTm may receive a verify signal from the control logic 140. The plurality of control transistors CT1 to CTm may be turned on in response to the verify signal VS. During a verify operation, the verify signal VS may be activated to a logic value of "1", and the plurality of control transistors CT1 to CTm may be turned on.

The first to m-th sensing transistors DT1 to DTm may be operated in response to the first to m-th nodes N1 to Nm. As described above, the first node N1 may be a node coupled to the second latch circuit LAT2 1312 of the first page buffer PB1, and may have a voltage value corresponding to the bit data stored in the second latch circuit LAT2 1312. In an embodiment, the first node N1 may have a logic value of "1" when the threshold voltage of a drain select transistor coupled to the first page buffer PB1 is lower than the verify voltage. Here, programming of the corresponding drain select transistor is not yet completed. The first node N1 may have a logic value of "0" when the threshold voltage of the drain select transistor coupled to the first page buffer PB1 is higher than the verify voltage. In this case, the corresponding drain select transistor is in a program-passed state.

As the program operation and the verify operation are repeated, the number of nodes having a logic value of "0", among the nodes N1 to Nm, may increase, and the number of nodes having a logic value of "1" may decrease. That is, the number of turned-on sensing transistors may decrease. Therefore, the paths through which the current flowing through the first line L1 is discharged to the reference node may be blocked. As a result, the voltage of the sensing node DN may increase.

The voltage comparator 162 may include a current mirror 163, a fail bit setter 165, and a comparator 166. The current mirror 163 is coupled to the voltage setter 161 through the first line L1, and is coupled to the fail bit setter 165 through a second line L2. The current mirror 163 may receive a supply voltage through a power node Vdd. The current mirror 163 may receive sensing current control signals SDC and mirroring current control signals SMC from the control logic 140, and may be operated based on the sensing current control signals SDC and the mirroring current control signals SMC. The sensing current control signals SDC illustrated in FIG. 9 refer to first to r-th sensing current control signals SDC1 to SDCr, and the mirroring current control signals SMC refer to first to r-th mirroring current control signals SMC1 to SMCr.

The current mirror 163 may include a current mirror component 164, a plurality of first transistors T11 to T1r, and a plurality of second transistors T21 to T2r.

The current mirror component 164 may mirror or duplicate the current flowing through the first line L1 to the second line L2. The current mirror component 164 may include a plurality of third transistors T31 to T3r coupled to the first line L1 and a plurality of fourth transistors T41 to T4r coupled to the second line L2. In FIG. 9, the plurality of third transistors T31 to T3r and the plurality of fourth transistors T41 to T4r are illustrated as being provided. However, this is only an example, and thus at least one third transistor coupled to the first line L1 and at least one fourth transistor coupled to the second line L2 may be provided.

The plurality of third transistors T31 to T3r may be coupled between the first line L1 and the plurality of first transistors T11 to T1r, respectively. Each of the plurality of third transistors T31 to T3r has a gate and a drain coupled to each other. The plurality of fourth transistors T41 to T4r may be coupled between the second line L2 and the plurality of second transistors T21 to T2r, respectively. Gates of the plurality of third transistors T31 to T3r and gates of the plurality of fourth transistors T41 to T4r are coupled to each other.

The plurality of first transistors T11 to T1r may be coupled in parallel to each other between the power node Vdd and the current mirror component 164. The plurality of first transistors T11 to T1r may be turned on or off in response to the first to r-th sensing current control signals SDC1 to SDCr, respectively. The plurality of second transistors T21 to T2r may be coupled in parallel to each other between the power node Vdd and the current mirror component 164. The plurality of second transistors T21 to T2r may be turned on or off in response to the first to r-th mirroring current control signals SMC1 to SMCr, respectively.

Current flowing through the first and second lines L1 and L2 may be controlled by adjusting the sensing current control signals SDC1 to SDCr and the mirroring current control signals SMC1 to SMCr. In an embodiment, in response to the sensing current control signals SDC1 to SDCr, the number of transistors to be turned on, of the plurality of first transistors T11 to T1r, may be controlled and the amount of current flowing through the first line L1 may be controlled. For example, as the number of turned-on transistors, of the plurality of first transistors T11 to T1r, decreases, the amount of current flowing through the first line L1 may decrease.

In an embodiment, in response to the mirroring current control signals SMC1 to SMCr, the number of transistors to be turned on, of the plurality of second transistors T21 to T2r, may be controlled and the amount of current flowing through the second line L2 may be controlled. For example, as the number of turned-on transistors, of the plurality of second transistors T21 to T2r, decreases, the amount of current flowing through the second line L2 may decrease.

The fail bit setter 165 may be coupled to the current mirror 163 through the second line L2. The fail bit setter 165 may be operated in response to a verify signal VS. The fail bit setter 165 may receive bit setting signals BS from the control logic (e.g., 140 of FIG. 1). An impedance value of the fail bit setter 165 may be adjusted based on the bit setting signals BS. The bit setting signals BS may correspond to the minimum number of failed memory cells required to treat the result of the verify operation as a pass. When the impedance value of the fail bit setter 165 increases, the voltage of the comparison node CN may increase.

The comparator 166 may compare the voltages of the sensing node DN and the comparison node CN with each other, and may then generate a check signal CS. When the voltage of the sensing node DN is higher than that of the comparison node CN, the check signal CS may be activated. The control logic 140 having received the activated check signal CS may terminate the program operation on the drain select transistors in the corresponding string group. When the voltage of the sensing node DN is lower than that of the comparison node CN, the check signal CS may be deactivated. In response to the deactivated check signal CS, the control logic 140 may control the semiconductor memory device 100 to re-perform a program operation on the drain select transistors in the corresponding string group.

It is assumed that current of the same magnitude flows through both the first and second lines L1 and L2. Depending on the impedance value of the fail bit setter 165, the voltage of the comparison node CN may be determined. Also, as the program operation and the verify operation are repeatedly performed, the number of turned-on transistors, of the first to m-th sensing transistors DT1 to DTm, may decrease, and the voltage of the sensing node DN may increase. When the number of turned-on transistors, of the first to m-th sensing transistors DT1 to DTm, reaches the minimum number of turned-on transistors corresponding to the bit setting signals BS, the voltage of the sensing node DN may be greater than that of the comparison node CN. Accordingly, the check signal CS is activated.

The pass-fail check circuit 160 illustrated in FIG. 9 is only an example, and the present disclosure is not limited thereto. That is, various types of pass-fail check circuits different from that illustrated in FIG. 9 may also be used.

For claim construction purposes, the word simultaneously should be construed to mean at the same time. And since few electronic events occur at exactly the same time, i.e., they start and end at precisely the same instant, the word simultaneously should also be construed to mean at substantially the same time. Substantially should thus be construed as synonymous with approximately.

Those of ordinary skill in the art will appreciate that the method and apparatus of the present disclosure provides a semiconductor device which is capable of reducing the time required to program select transistors and a method of operating the semiconductor device.

What is claimed is:

1. A method of operating a semiconductor device, comprising:
   applying a program voltage to select lines, which are coupled to corresponding select transistors that is included in at least one string group of a plurality of string groups; and
   performing a verify operation on the select transistors,
   wherein performing the verify operation comprises:
      performing a verify check operation on first select transistors that is included in a first string group, of the plurality of string groups; and applying a verify voltage to a select line coupled to second select transistors that is included in a second string group of the plurality of string groups,
   wherein the performing the verify check operation on the first select transistors and the applying the verify voltage to a select line coupled to the second select transistors are performed simultaneously.

2. The method according to claim 1, wherein performing the verify operation comprises:
applying the verify voltage to a first select line coupled to the first select transistors; and
performing the verify check operation on the first select transistors and applying the verify voltage to a second select line coupled to the second select transistors.

3. The method according to claim 2, wherein performing the verify operation further comprises:
performing a verify check operation on the second select transistors and applying the verify voltage to a third select line coupled to third select transistors included in a third string group, of the plurality of string groups.

4. The method according to claim 3, wherein performing the verify operation further comprises:
performing a verify check operation on the third select transistors and applying the verify voltage to a fourth select line coupled to fourth select transistors included in a fourth string group, of the plurality of string groups.

5. The method according to claim 1, wherein the select transistors comprise a drain select transistor.

6. The method according to claim 1, wherein the select transistors comprise a source select transistor.

7. The method according to claim 1, wherein performing the verify operation comprises:
applying the verify voltage to a first select line coupled to the first select transistors and then storing results of verification of the first select transistors in first latch circuits comprising corresponding page buffers;
storing values, stored in the first latch circuits, in corresponding second latch circuits, respectively;
storing results of verification of the second select transistors in the first latch circuits, respectively; and
performing a verify check operation on the first select transistors based on values stored in the second latch circuits,
wherein storing the results of verification of the second select transistors in the first latch circuits, respectively, and performing the verify check operation on the first select transistors based on the values stored in the second latch circuits are simultaneously performed.

8. The method according to claim 7, wherein the results of verification of the first select transistors are logic values indicating whether respective threshold voltages of the first select transistors are greater than the verify voltage.

9. The method according to claim 7, wherein performing the verify check operation on the first select transistors comprises:
determining, based on the values stored in the second latch circuits, whether a number of transistors having threshold voltages greater than the verify voltage, of the first select transistors, is greater than a preset reference value.

10. The method according to claim 7, further comprising:
storing values, stored in the first latch circuits, in corresponding second latch circuits, respectively;
storing results of verification of third select transistors included in a third string group, of the plurality of string groups, in the first latch circuits, respectively; and
performing a verify check operation on the second select transistors based on values stored in the second latch circuits,
wherein storing results of verification of the third select transistors in the first latch circuits, respectively, and performing the verify check operation on the second select transistors are simultaneously performed.

11. The method according to claim 10, further comprising:
storing values, stored in the first latch circuits, in corresponding second latch circuits, respectively;
storing results of verification of fourth select transistors included in a fourth string group, of the plurality of string groups, in the first latch circuits, respectively; and
performing a verify check operation on the third select transistors based on values stored in the second latch circuits,
wherein storing the results of verification of the fourth select transistors in the first latch circuits, respectively, and performing the verify check operation on the third select transistors are simultaneously performed.

12. A method of operating a semiconductor device, comprising:
applying a program voltage to select lines, which are coupled to corresponding select transistors included in first to N-th string groups; and
performing a verify operation on the select transistors,
wherein performing the verify operation comprises:
performing a verify check operation on i-th select transistors included in an i-th string group, of the first to N-th string groups; and
applying a verify voltage to a select line coupled to (i+1)-th select transistors included in an (i+1)-th string group,
wherein the performing the verify check operation on the i-th select transistors and the applying the verify voltage to the select line coupled to the (i+1)-th select transistors are performed simultaneously, where N is a natural number equal to or greater than 2, and i is a natural number equal to or greater than 1 and less than N.

13. The method according to claim 12, wherein performing the verify operation on the select transistors comprises:
applying the verify voltage to an i-th select line coupled to the i-th select transistors and then storing results of verification of the i-th select transistors in first latch circuits in corresponding page buffers;
storing values, stored in the first latch circuits, in corresponding second latch circuits, respectively;
storing results of verification of the (i+1)-th select transistors in the first latch circuits respectively; and
performing a verify check operation on the i-th select transistors based on values stored in the second latch circuits,
wherein storing the results of verification of the (i+1)-th select transistors in the first latch circuits, respectively, and performing the verify check operation on the i-th select transistors based on the values stored in the second latch circuits are simultaneously performed.

14. A semiconductor device, comprising:
a first string group comprising first select transistors;
a second string group comprising second select transistors;
a peripheral circuit comprising a plurality of page buffers, each of the plurality of page buffers comprising a first latch circuit and a second latch circuit and which is configured to perform a program operation on the first and second select transistors; and
a control logic configured to control the program operation of the peripheral circuit,
wherein the control logic is configured to control the peripheral circuit to:

apply a verify voltage to the first select transistors and then store results of verification of the first select transistors in first latch circuits of corresponding page buffers, respectively, store values, stored in the first latch circuits, in corresponding second latch circuits, respectively, and simultaneously perform an operation of storing the results of verification of the second select transistors in the first latch circuits, respectively, and a verify check operation on the first select transistors based on the values stored in the second latch circuits.

15. The semiconductor device according to claim 14, wherein the first and second select transistors comprise at least one drain select transistor.

16. The semiconductor device according to claim 14, wherein the first and second select transistors comprise at least one source select transistor.

17. The semiconductor device according to claim 14, wherein the peripheral circuit comprises a pass-fail check circuit, which is coupled to the second latch circuits.

18. The semiconductor device according to claim 17, wherein the pass-fail check circuit is configured to determine, based on values stored in the second latch circuits, whether a number of select transistors having threshold voltages higher than the verify voltage, of the first select transistors, is greater than a preset reference value.

19. A method of operating a semiconductor device, comprising:

applying an erase voltage to select transistors included in first to N-th string groups; and performing a verify operation on the select transistors, wherein performing the verify operation comprises:

performing a verify check operation on i-th select transistors included in an i-th string group, of the first to N-th string groups; and applying a verify voltage to a select line coupled to (i+1)-th select transistors included in an (i+1)-th string group, wherein the performing the verify check operation on the i-th select transistors and the applying the verify voltage to the select line coupled to the (i+1)-th select transistors are performed simultaneously, where N is a natural number equal to or greater than 2, and i is a natural number equal to or greater than 1 and less than N.

20. The method according to claim 19, wherein performing the verify operation on the select transistors comprises:

applying the verify voltage to an i-th select line coupled to the i-th select transistors and then storing results of verification of the i-th select transistors in first latch circuits in corresponding page buffers;

storing values, stored in the first latch circuits, in corresponding second latch circuits, respectively;

storing results of verification of the (i+1)-th select transistors in the first latch circuits respectively; and performing a verify check operation on the i-th select transistors based on values stored in the second latch circuits, wherein storing the results of verification of the (i+1)-th select transistors in the first latch circuits, respectively, and performing the verify check operation on the i-th select transistors based on the values stored in the second latch circuits are simultaneously performed.

* * * * *